(12) United States Patent
Tsuno et al.

(10) Patent No.: US 8,444,281 B2
(45) Date of Patent: May 21, 2013

(54) OPTICAL DEVICE

(75) Inventors: Katsuhiko Tsuno, Tokyo (JP); Shoko Suyama, Tokyo (JP); Yoshiyasu Ito, Tokyo (JP)

(73) Assignee: NEC Toshiba Space Systems, Ltd., Tokyo (JP)

( * ) Notice: Subject to any disclaimer, the term of this patent is extended or adjusted under 35 U.S.C. 154(b) by 248 days.

(21) Appl. No.: 12/801,254

(22) Filed: May 28, 2010

(65) Prior Publication Data

US 2010/0309570 A1 Dec. 9, 2010

(30) Foreign Application Priority Data

Jun. 1, 2009 (JP) ................................ 2009-131918

(51) Int. Cl.
*G02B 5/08* (2006.01)

(52) U.S. Cl.
USPC .......................... 359/883; 359/850; 428/687

(58) Field of Classification Search ................. 359/850, 359/883; 428/687, 912.2
See application file for complete search history.

(56) References Cited

U.S. PATENT DOCUMENTS

| | | | | |
|---|---|---|---|---|
| 4,214,818 | A * | 7/1980 | Choyke et al. | 359/845 |
| 4,443,059 | A * | 4/1984 | Wells | 359/845 |
| 4,825,062 | A * | 4/1989 | Rather et al. | 250/201.1 |
| 7,244,034 | B1 * | 7/2007 | Karandikar et al. | 359/838 |
| 7,740,362 | B1 * | 6/2010 | Neil et al. | 359/845 |
| 2004/0246610 | A1 | 12/2004 | Tsuno et al. | |
| 2006/0158753 | A1 * | 7/2006 | Ealey | 359/849 |
| 2008/0043352 | A1 | 2/2008 | Liu | |
| 2008/0131665 | A1 | 6/2008 | Suyama et al. | |
| 2009/0039536 | A1 * | 2/2009 | Doan et al. | 264/1.9 |
| 2010/0279446 | A1 * | 11/2010 | Henrichs | 438/31 |
| 2011/0309271 | A1 * | 12/2011 | Moriya et al. | 250/504 R |

FOREIGN PATENT DOCUMENTS

| | | |
|---|---|---|
| DE | 39 34 546 A1 | 4/1991 |
| DE | 199 62 831 A1 | 7/2001 |
| DE | 100 35 111 A1 | 10/2001 |
| EP | 0 642 040 A1 | 3/1995 |
| JP | 8-21905 A | 1/1996 |
| JP | 8-94813 A | 4/1996 |
| JP | 2001-348288 | 12/2001 |
| JP | 2004-317647 | 11/2004 |
| JP | 2005-22905 | 1/2005 |
| JP | 2005-195706 A | 7/2005 |
| JP | 2005-234344 A | 9/2005 |
| JP | 2008-137830 | 6/2008 |
| JP | 2009-205108 A | 9/2009 |

OTHER PUBLICATIONS

European Search Report dated Aug. 3, 2010.
B. Harnisch, et al., "Ultra-lightweight C/SiC Mirrors and Structures", ESA Bulletin, ESA Scientific and Publications Branch, Noordwijk, NL, No. 95, Aug. 1, 1998, pp. 108-112, XP000776670.
Shoko Suyama, et al, "Nanostructured Joining Technology for High-Strength Reaction-Sintered Silicon Carbide", Toshiba Review, Japan, 2008, vol. 63, No. 2, pp. 11-14.
Japanese Office Action dated Feb. 6, 2013 with partial translation thereof.

* cited by examiner

*Primary Examiner* — Jennifer L. Doak
(74) *Attorney, Agent, or Firm* — McGinn IP Law Group, PLLC

(57) ABSTRACT

An optical device has a reflecting mirror using a particle-dispersed silicon material including silicon carbide and silicon. The reflecting mirror includes a plurality of segments joined to each other by reaction sintering. Producing the segments is easy in comparison with that of a reflecting mirror of one piece. Accordingly, it is possible to reduce probability of breakage of the segments and to shorten process time of production of a reflecting mirror.

19 Claims, 5 Drawing Sheets

OPTICAL DEVICE

This application is based upon and claims the benefit of priority from Japanese patent application No. 2009-131918, filed on Jun. 1, 2009, the disclosure of which is incorporated herein in its entirety by reference.

BACKGROUND

1. Field of the Invention

The present invention relates to an optical device, and more particularly to an optical device having an optical reflecting mirror.

2. Description of the Related Art

There has heretofore been known an optical device using a particle-dispersed silicon material. See, e.g., Japanese laid-open patent publication No. 2004-317647 (Patent Document 1).

SUMMARY

Longer time is required for processing a conventional optical reflecting mirror using a particle-dispersed silicon material as the optical reflecting mirror is increased in size. Longer process time increases the probability of producing a defective reflecting mirror due to breakage during the processing, resulting in an increase of the cost. Therefore, it has been desired to shorten the process time for a reflecting mirror and to reduce the cost of a reflecting mirror.

According to an optical device of the present invention, an optical device includes a reflecting mirror which has plurality of segments joined to each other. The segments are formed of a particle-dispersed silicon material including silicon carbide and silicon. Therefore, it is possible to shorten the time required for processing each segment and to reduce a rate of defective products due to breakage. Accordingly, the cost of an optical reflecting mirror can be reduced.

The above and other objects, features, and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

An optical device according to an embodiment of the present invention will be described below with reference to FIGS. 1 to 7.

Figure 1:
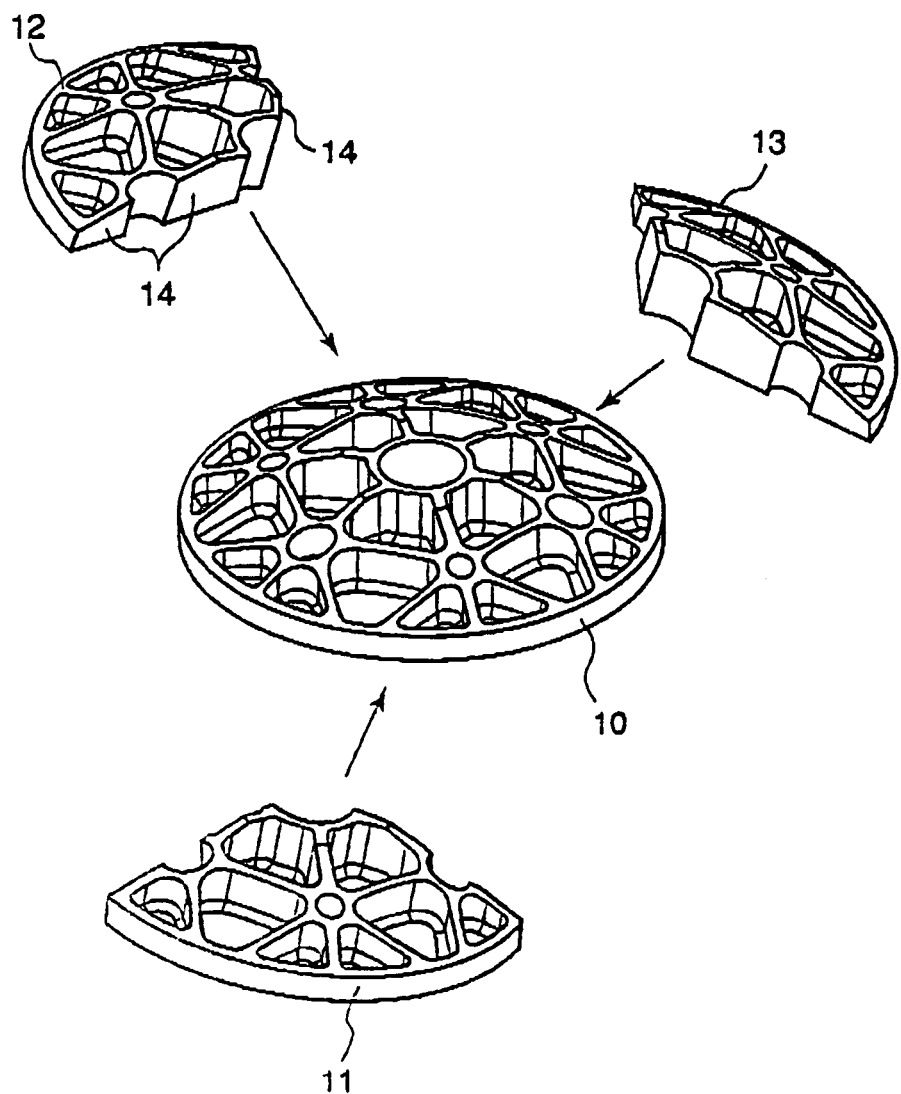
FIG. 1 is a view explanatory of an optical reflecting mirror according to an embodiment of the present invention.

FIG. 1 shows an optical reflecting mirror 10 used in an optical device according to the present invention. The optical reflecting mirror 10 is formed by joining three segments 11, 12, and 13 to each other.

Each of the segments 11-13 is formed of a particle-dispersed silicon material. A particle-dispersed silicon material is disclosed in Japanese laid-open patent publication No. 2001-348288 as well as Patent Document 1.

A particle-dispersed silicon material has a flexural strength twice or more than that of a usual silicon carbide ceramic (e.g., 800 MPa or higher). Furthermore, a particle-dispersed silicon material has a dense structure without pores. Therefore, an optical reflecting mirror can be produced by polishing a surface of a particle-dispersed silicon material without coating the material with a different kind of a dense material.

A base material for the segment using a particle-dispersed silicon material (a material to be polished) is produced as follows.

1) A silicon carbide powder, a carbon powder, and a binder are mixed into a material powder.

2) The material powder is compressed into a compact by cold isostatic press.

3) The compact is subjected to a machining process so as to have substantially the same shape as a final product of the segment.

4) The processed compact is supplied into a kiln along with silicon and heated at a temperature that is equal to or higher than the melting temperature of silicon. Thus, the molten silicon reacts with carbon of the initial material, thereby producing silicon carbide. As a result, there can be obtained a base material for the segment that is formed of a particle-dispersed silicon material including silicon carbide of the initial material, silicon carbide produced by the reaction, and excess silicon. The resultant particle-dispersed silicon material hardly exhibits shrinkage at the time of burning. Therefore, it is possible to obtain a base material having a shape close to that of a final product of the segment.

5) Finally, the shape of the base material is adjusted by grinding. Thus, a final product of the segment is obtained.

The compact obtained by cold isostatic press has low strength because it has been formed of powder pressed under pressure in the above manufacturing process. Therefore, if a base material is produced integrally for a large reflecting mirror, it may be broken by the weight of the compact. Furthermore, breakage may be caused by difficult handling. According to the present embodiment, a base material is produced for each of a plurality of segments. Therefore, it is possible to reduce the possibility of the breakage.

For example, in a case where an optical reflecting mirror has a diameter of 1 m, an integrally formed compact has a weight of more than 300 kg. In contrast, when an optical reflecting mirror is divided into three segments, a compact for each segment has a weight of about 100 kg. This weight difference mitigates the requirements for the strength of tools used in the manufacturing process or the like. After the integrally formed compact is processed, it has a weight of about 30 kg. After the compact for each segment is processed, it has a weight of about 10 kg.

Furthermore, when a compact is subject to a machining process, the probability of breakage of the compact is increased if the process time becomes longer. As the compact (the process area) is larger, the process time for the compact becomes longer. In the present embodiment, the reflecting mirror is manufactured from a plurality of divided segments. Since each segment requires a shorter process time, the probability of breakage can be reduced.

For example, it is assumed that a yield of processing an integrally formed compact of a reflecting mirror is 50%. In this case, if two reflecting mirrors are manufactured, the probability of getting at least one completed reflecting mirror is 75%. On the other hand, a yield of processing a single segment of three divided segments is in proportion to the process time (i.e., the process area) and is thus about 79%, which is higher than that of the integrally formed compact. When four segments are processed, the probability of getting three good products is about 81%. Assuming that a yield of producing a reflecting mirror by connecting those segments to each other is 90%, the probability of getting one completed product from four segments is about 73%. This probability is almost the same as the yield in the case where one completed product is obtained from two reflecting mirrors that have been produced from an integrally formed compact. However, time required for processing four segments is two-thirds of time required for processing two integrally formed compacts. The amount of material used for four segments is also two-thirds of the amount of material used for two integrally formed compacts. Therefore, according to the present embodiment, it is possible to shorten the process time for a reflecting mirror and to reduce the cost of a reflecting mirror by reduction of the amount of material used. In other words, according to the present embodiment, the yield can be improved with use of the same amount of material as in the conventional technology.

The above example assumes that three divided segments have the same shape. Even if those segments have different shapes, it is possible to shorten the process time for a reflecting mirror and to reduce the cost of a reflecting mirror as with the above example because segments having the same shape are needed to manufacture a plurality of reflecting mirror products.

The segments produced as described above are joined to each other so as to form an optical reflecting mirror. The technology disclosed in Japanese laid-open patent publications Nos. 2005-22905 and 2008-137830 can be used to join those segments to each other.

Specifically, the segments are joined as follows.

1) First, Si is removed from bonding surfaces 14 of the segments 11-13 by heat treatment or chemical treatment.

2) An organic adhesive agent is applied to the boding surfaces 14. The segments are bonded to each other so as to form a joined body. Then heat treatment is performed so that the organic adhesive agent has a porous structure.

3) The joined body is heated to a temperature that is equal to or higher than the melting point of Si so as to impregnate the molten Si. Thus, the porous structure is subjected to reaction sintering, so that the segments 11-13 are integrated.

The organic adhesive agent may include silicon carbide powder (and carbon powder).

The segments may be bonded by an adhesive agent before they are sintered. Thus, sintering of the segments and reaction sintering of the joined portions may be conducted simultaneously.

Figure 2:
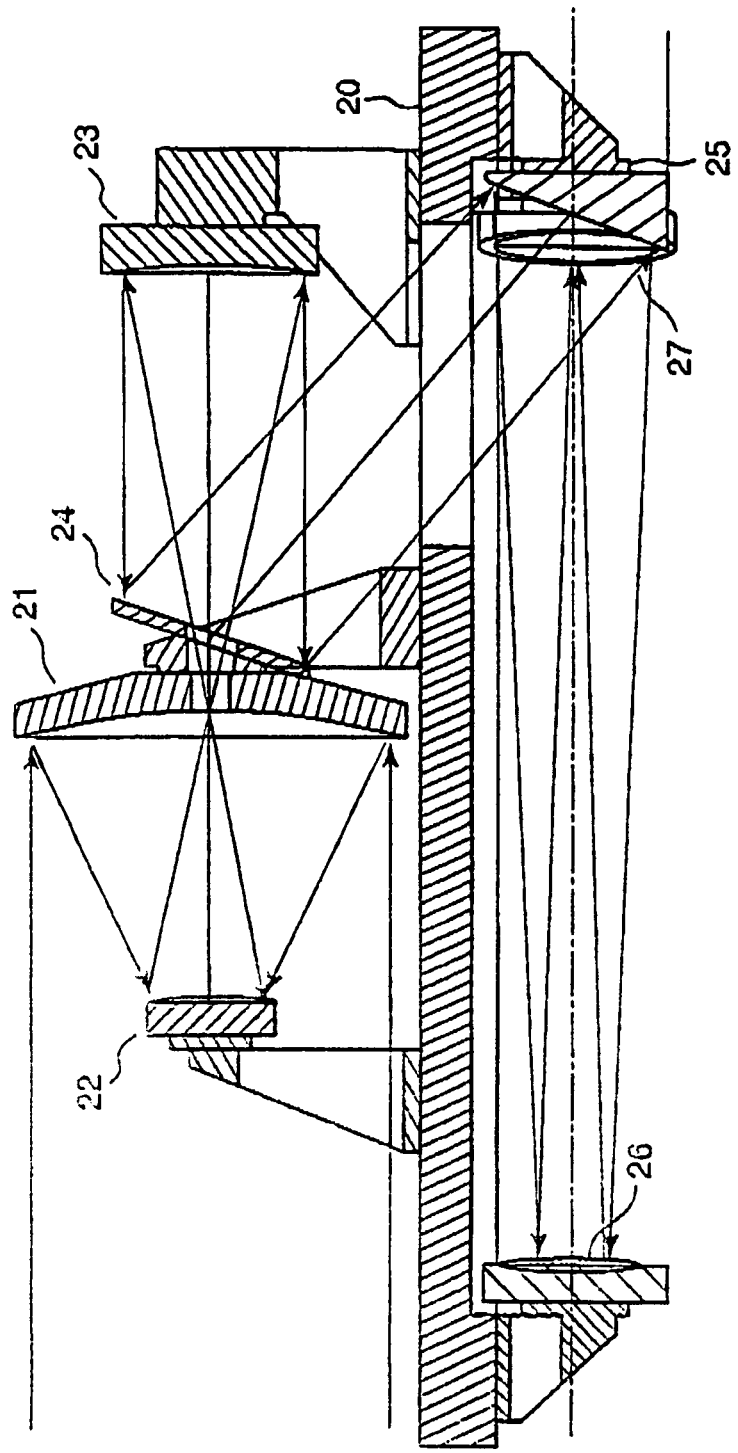
FIG. 2 is a view showing an arrangement of an optical device using the optical reflecting mirror of FIG. 1.
Figure 3:
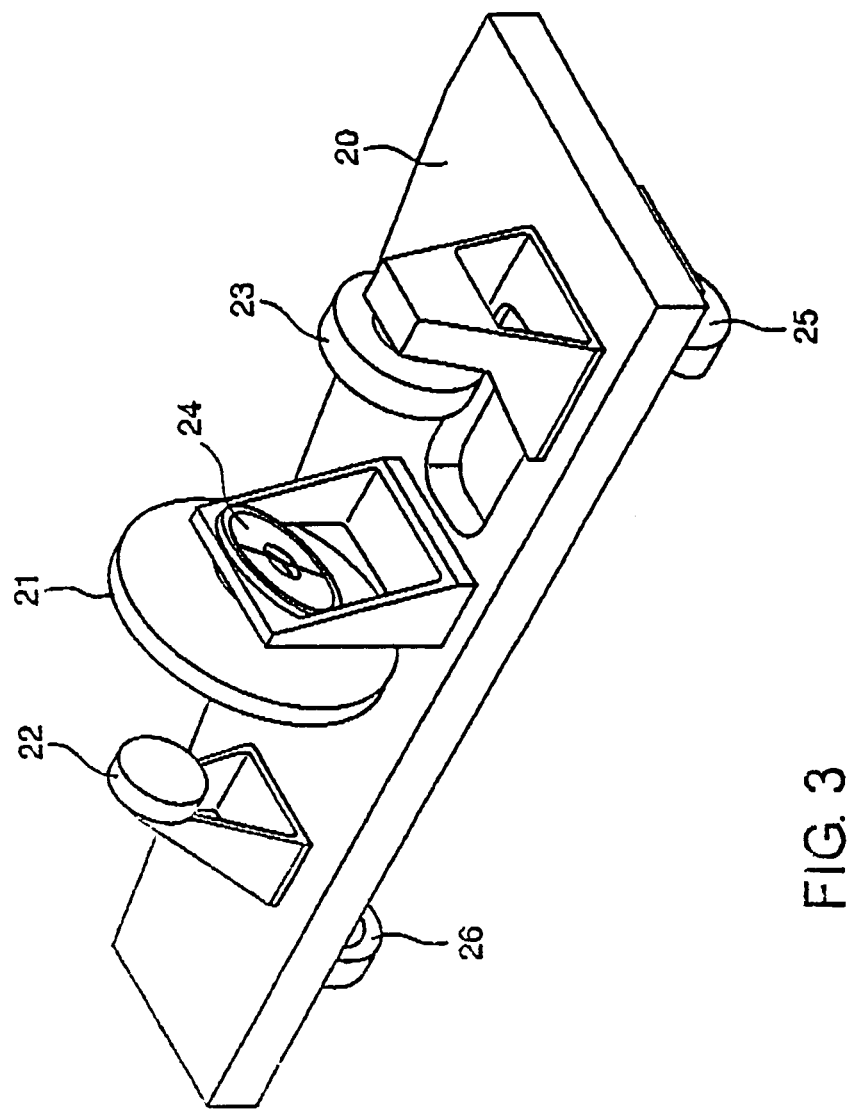
FIG. 3 is a perspective view of the optical device of FIG. 2.

The integrated optical reflecting mirror is subjected to necessary processes such as mirror polishing and is used, for example, as a primary mirror 21 of an optical device shown in FIGS. 2 and 3 (a reflecting telescope in this example).

The illustrated optical device includes an optical bench 20 (i.e. an optical structure), a primary mirror 21, a secondary mirror 22, a tertiary mirror 23, a fold mirror (quaternary mirror) 24, a fold mirror (quinary mirror) 25, a fold mirror (senary mirror) 26, and a focal plane 27. The primary mirror 21, the secondary mirror 22, the tertiary mirror 23, the fold mirrors 24-26, and the focal plane 27 are provided on the optical bench 20.

As a method of designing an optical device such as a reflecting telescope, there has been known an athermal method of forming the entire optical device, including a body tube, of the same material so that the characteristics of the optical device do not depend upon the temperature. When the entire optical device is formed of the same material having the same coefficient of linear expansion, the entire device is maintained to have a similar shape as long as the temperature of the entire device is maintained uniformly even if the temperature of the entire device is varied. As a result, the focus of the telescope remains at the same position relative to the optical device. Therefore, when a film or a detector is arranged at such a position, an obtained image is in good focus if the temperature of the device is maintained uniformly. In other words, such a device has thermal stability.

The coefficient of linear expansion of a particle-dispersed silicon material is $2.5 \times 10^{-6}$ $K^{-1}$, which is lower than that of metal. Furthermore, a particle-dispersed silicon material has high thermal conductivity. Thus, a particle-dispersed silicon material is a suitable material for athermal design. In a case of an optical device produced by using a particle-dispersed silicon material, the entire device can readily be maintained at a uniform temperature. Even if any temperature variation is produced, only a small strain is caused by the temperature variation. Components of the optical device shown in FIGS. 2 and 3 are formed of a particle-dispersed silicon material, which is the same as a material of the primary mirror. Those components are joined to each other by the aforementioned reaction sintering.

Some components require an assembling precision of 1 micrometer or less (sometimes 10 nm or less). Furthermore, adjustment of the reflecting mirror is essentially required. Therefore, not all of the components can be joined to each other by reaction sintering. Components that cannot be joined to each other are joined by fastening bolts or the like with an adhesive agent or a thermal conductive sheet having a high thermal conductivity. With such a method, it is possible to achieve the uniformity of the temperature and to provide a high-performance optical device.

Figure 4:
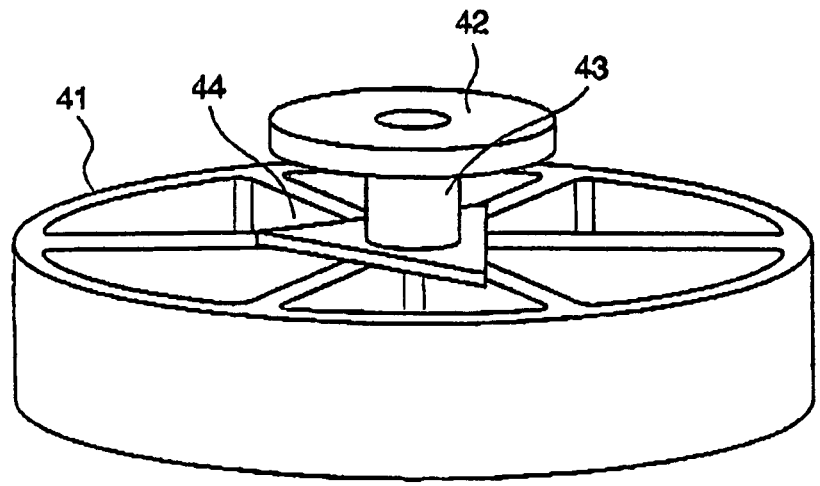
FIG. 4 is a perspective view explanatory of a structure of a support portion for the optical reflecting mirror in the optical device of FIG. 2.
Figure 5:
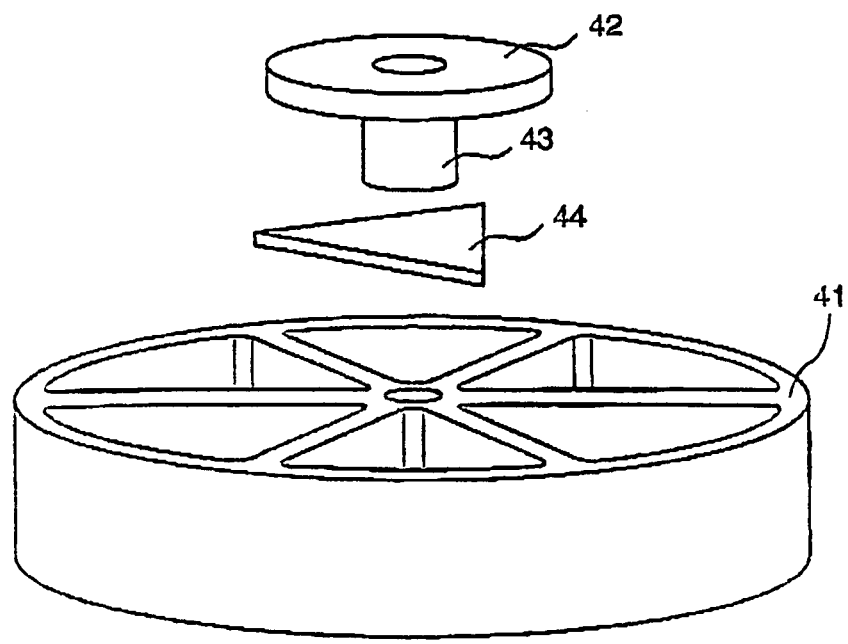
FIG. 5 is an exploded perspective view showing the support portion of FIG. 4.

For example, a structure as shown in FIGS. 4 and 5 can be used to eliminate the influence of fastening bolts upon the reflecting mirror. In the illustrated structure, an attachment flange 42 is attached to a rear face of an optical reflecting mirror 41 via a pipe 43 and a support plate (triangular plate) 44. The flange 42, the pipe 43 and the support plate 44 are form a support portion. The attachment flange 42 and the pipe 43, the pipe 43 and the support plate 44, and the support plate 44 and the reflecting mirror 41 are respectively joined to each other by the aforementioned reaction sintering. With this configuration, even if the attachment flange 42 is fixed to a support base or the like by fastening bolts, deformation due to the fastened bolts or the like exerts no influence upon the optical reflecting mirror 41.

Figure 6:
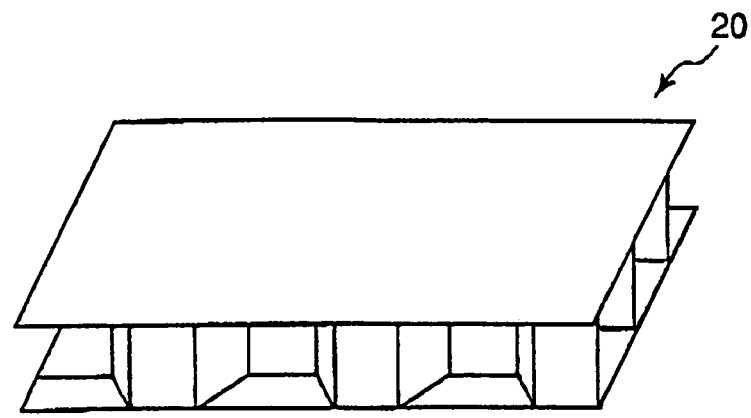
FIG. 6 is a perspective view showing a structure of an optical bench used in the optical device of FIG. 2.
Figure 7:
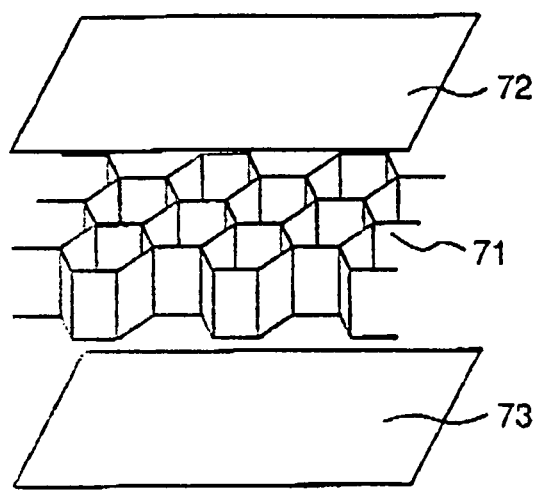
FIG. 7 is an exploded perspective view showing the optical bench of FIG. 6.

Furthermore, the optical bench 20 may have a honeycomb structure as shown in FIG. 6 to achieve sufficient stiffness and weight reduction. Specifically, as shown in FIG. 7, the optical bench 20 may have a plurality of components, i.e., a core 71 of a honeycomb structure and surface plates 72 and 73 covering upper and lower surfaces of the core 71. Those components can be produced by using a particle-dispersed silicon material and can be joined to each other by reaction sintering with the same method as described in connection with the optical reflecting mirror. The core 71 may be divided into a plurality of segments to shorten the process time, reduce the amount of material used, and reduce the cost as in the case of production of the reflecting mirror.

While the present invention has been described with reference to the embodiment thereof, the present invention is not limited to the illustrated embodiment. It should be understood that various changes and modifications may be made therein without departing from the scope of the appended claims. For example, the optical reflecting mirror is divided into three segments in the above embodiment. Nevertheless, the optical reflecting mirror may be divided into two segments, or four or more segments in consideration of the weight and shape of the optical reflecting mirror.

The present invention is applicable to optical devices that require high stability, such as a telescope mounted on a spacecraft, a telescope mounted on an aircraft, a ground astronomical telescope, and a semiconductor exposure apparatus.

What is claimed is:

1. A method for manufacturing an optical device, said method comprising:
   preparing, by powder compression, a plurality of segments which comprises a particle-dispersed silicon material that includes silicon carbide and silicon;
   preparing a support portion which comprises the particle-dispersed silicon material that includes silicon carbide and silicon,
   jointing the segments to each other by reaction sintering to form a reflecting mirror;
   attaching the support portion to the reflecting mirror by the reaction sintering; and
   providing the reflecting mirror and the support portion on an optical device structure which comprises the particle-dispersed silicon material that includes silicon carbide and silicon, wherein the method further comprises:
   before the preparing of the reflecting mirror and the support portion, preparing a plurality of parts for the optical device structure; and
   jointing the parts to each other by beforehand reaction sintering to form the optical device structure.

2. The method as recited in claim 1, wherein at least one of the parts of the optical structure comprises a plurality segments joined to each other by reaction sintering.

3. A method for manufacturing an optical device, said method comprising:
   preparing, by powder compression, a plurality of segments which comprises a particle-dispersed silicon material that includes silicon carbide and silicon; and
   jointing the segments to each other by reaction sintering to form a reflecting mirror,
   wherein said jointing the segments comprises removing the silicon from bonding surfaces of the segments prior to the reaction sintering.

4. An optical device manufactured by the method of claim 3.

5. The optical device as recited in claim 1, wherein the segments have substantially the same shape.

6. The optical device as recited in claim 1, further comprising:
   a support portion attached to the reflecting mirror,
   wherein the support portion comprise the particle-dispersed silicon material that includes silicon carbide and silicon.

7. The optical device as recited in claim 6, wherein the support portion comprises a plurality of parts joined to each other by the reaction sintering.

8. The optical device as recited in claim 6, further comprising:
   an optical device structure on which the reflecting mirror and the support portion are provided,
   wherein the optical device structure comprise the particle-dispersed silicon material that includes silicon carbide and silicon.

9. The optical device as recited in claim 8, wherein the optical device structure comprises a plurality of parts joined to each other by the reaction sintering.

10. The optical device as recited in claim 9, wherein at least one of the parts of the optical structure comprises a plurality segments joined to each other by the reaction sintering.

11. The method as recited in claim 3, wherein the segments have substantially the same shape.

12. The method as recited in claim 3, further comprising:
    preparing a support portion which comprises the particle-dispersed silicon material that includes silicon carbide and silicon, and
    attaching the support portion to the reflecting mirror by the reaction sintering.

13. The method as recited in claim 12, further comprising:
    before the preparing of the support portion, preparing a plurality of parts for the support portion; and
    jointing the parts to each other by beforehand reaction sintering to form the support portion.

14. The method as recited in claim 12, further comprising:
    providing the reflecting mirror and the support portion on an optical device structure which comprises the particle-dispersed silicon material that includes silicon carbide and silicon.

15. The method as recited in claim 3, wherein said jointing the segments further comprises applying an organic adhesive agent to the bonding surfaces;
    connecting the segments to each other to form a joined body; and
    performing a heat treatment such that the organic adhesive agent creates a porous structure.

16. The method as recited in claim 15, wherein said jointing the segments further comprises:
    heating the joined body to a temperature that is equal to or higher than a melting point of the silicon to impregnate a molten silicon; and
    subjecting the porous structure to the reaction sintering to integrate the segments.

17. A method for manufacturing an optical device, said method comprising:
    preparing, by powder compression, a plurality of segments which comprises a particle-dispersed silicon material that includes silicon carbide and silicon; and
    jointing the segments to each other by reaction sintering to form a reflecting mirror,
    wherein said powder compression comprises:
    compressing a material powder to a compact in a cold isostatic press, and
    wherein the material powder comprises a silicon carbide powder and a carbon powder.

18. The method as recited in claim 17, further comprising:
    heating the compact and a silicon material while melting said silicon material to a molten silicon; and
    producing a silicon carbide by a reaction of the molten silicon with the carbon powder.

19. The method as recited in claim 18, further comprising:
    forming said particle-dispersed silicon material that comprises:
    an excess silicon that constitute said silicon; and
    said silicon carbide of said particle-dispersed silicon material that comprises a silicon carbide of the silicon carbide powder and the silicon carbide produced by the reaction of the molten silicon with the carbon powder.

* * * * *